United States Patent [19]

Jacobs et al.

[11] Patent Number: 5,416,856
[45] Date of Patent: May 16, 1995

[54] METHOD OF ENCODING A DIGITAL IMAGE USING ITERATED IMAGE TRANSFORMATIONS TO FORM AN EVENTUALLY CONTRACTIVE MAP

[75] Inventors: Everett W. Jacobs; Roger D. Boss, both of San Diego; Yuval Fisher, La Jolla, all of Calif.

[73] Assignee: The United States of America as represented by the Secretary of the Navy, Washington, D.C.

[21] Appl. No.: 860,648

[22] Filed: Mar. 30, 1992

[51] Int. Cl.⁶ .............................................. G06K 9/36
[52] U.S. Cl. ................................. 382/232; 358/248
[58] Field of Search ................... 382/56, 30, 27, 41, 382/46–47; 358/432, 433, 467

[56] References Cited

U.S. PATENT DOCUMENTS

| | | | |
|---|---|---|---|
| 4,783,841 | 11/1988 | Crayson | 382/56 |
| 4,797,943 | 1/1989 | Murayama et al. | 382/54 |
| 4,807,298 | 2/1989 | Conte et al. | 382/56 |
| 4,922,273 | 5/1990 | Yonekawa et al. | 358/429 |
| 4,941,193 | 7/1990 | Barnsley et al. | |
| 4,965,754 | 10/1990 | Stansfield et al. | 364/526 |
| 5,065,447 | 11/1991 | Barnsley et al. | 382/56 |
| 5,076,662 | 12/1991 | Shih et al. | 382/47 |

OTHER PUBLICATIONS

Barnsley et al. "Harnessing Chaos for Image Synthesis" SIGGRAPH '88 Atlanta, Aug. 1–5, 1988.

Elton, "An Ergodic Theorem for Iterated Maps", Feb. 1986.
Denko, "Construction of Fractal Objects with Iterated Functions Systems", Nov. 3, 1985.
Jacquin, "Fractal Image Coding on a Theory of Iterated Contractive Image Transformations", SPIE Proceedings vol. 1360, Oct. 1, 1990, pp. 227–239.

*Primary Examiner*—Michael T. Razavi
*Assistant Examiner*—Larry J. Prikockis
*Attorney, Agent, or Firm*—Harvey Fendelman; Thomas Glenn Keough

[57] ABSTRACT

A method is provided for encoding an image in an iterated transformation image compression system. The image, represented by an array of pixels, is partitioned into ranges and domains. A transformation is generated for each domain such that no transformation is constrained to be contractive. Each domain's transformation is optimized in terms of the intensity scaling and offset coefficients. A domain and corresponding optimized transformation is selected that minimizes transformation error data. These steps are repeated for a chosen plurality of the ranges that form a non-overlapping tiling of the image and such that the corresponding optimized transformations associated with the chosen plurality form an eventually contractive map. Information that identifies each of the chosen plurality of the ranges and the selected domains and corresponding optimized transformations is then stored in an addressable memory as an encoding of the image.

12 Claims, 4 Drawing Sheets

METHOD OF ENCODING A DIGITAL IMAGE USING ITERATED IMAGE TRANSFORMATIONS TO FORM AN EVENTUALLY CONTRACTIVE MAP

STATEMENT OF GOVERNMENT INTEREST

The invention described herein may be manufactured and used by or for the Government of the United States for governmental purposes without the payment of any royalties thereon or therefor.

This patent application is copending with our related patent application entitled "Method of Encoding a Digital Image Using Adaptive Partitioning in an Iterated Transformation System", Ser. No. 07/859,782, filed Mar. 30, 1992.

FIELD OF THE INVENTION

The present invention relates to the field of digital image compression, and more particularly to a method of encoding a digital image using iterated transformations to form an eventually contractive map.

BACKGROUND OF THE INVENTION

Advances in computer hardware and software technology have brought about increasing uses of digital imagery. However, the amount of memory necessary to store a large number of high resolution digital images is significant. Furthermore, the time and bandwidth necessary to transmit the images is unacceptable for many applications. Accordingly, there has been considerable interest in the field of digital image compression.

The basic elements of a digital image compression system are shown schematically in FIG. 1, and are referenced by those elements contained within dotted line box 100. A digitized image is processed by an encoder 101 to reduce the amount of information required to reproduce the image. This information is then typically stored as compressed data in a memory 102. When the image is to be reconstructed, the information stored in memory 102 is passed through a decoder 103.

The goal of a good compression method implemented by encoder 101 is to attain a high compression ratio with minimal loss in fidelity. One of the latest approaches to the image compression problem has been put forth by Arnaud Jacquin in a paper entitled "Fractal Image Coding Based on a Theory of Iterated Contractive Image Transformations", appearing in The International Society for Optical Engineering Proceedings Volume 1360, Visual Communications and Image Processing, October 1990, pp. 227-239. As is known in the art, fractal image generation is based on the iteration of simple deterministic mathematical procedures that can generate images with infinitely intricate geometries (i.e. fractal images). However, to use these fractal procedures in digital image compression, the inverse problem of constraining the fractal complexity to match the given complexity of a real-world image must be solved. The "iterated transformation" method of Jacquin constructs, for each original image, a set of transformations which form a map that encodes the original image. Each transformation maps a portion of the image to another portion of the image. The transformations, when iterated, produce a sequence of images which converge to a fractal approximation of the original image.

In order for a transformation to map onto some portion of the original image within a specified error bound, the transformation must be optimized in terms of position, size and intensity. Further, a fundamental requirement of Jacquin's iterated transformation method is that each transformation is constrained to be "contractive". Contractivity means that the size and intensity of a transformation are scaled down relative to that portion of the original image from which it is being mapped. However, restricting acceptable transformations to those that are contractive reduces the total number of possible transformations that may be chosen.

Thus, the need exists for a method of encoding an original digital image using iterated transformation techniques that expands the total number of possible transformations in order to determine a better set of transformations that encode an image. Accordingly, it is an object of the present invention to provide a method of encoding an image using iterated transformation techniques that maximizes image compression while minimizing loss in fidelity.

SUMMARY OF THE INVENTION

In accordance with the present invention, a method is provided for encoding an image in an iterated transformation image compression system. The image is represented by an array of pixels defining an image area. Each pixel is defined by a three-dimensional vector identifying the position of the pixel in the array and an intensity level of the pixel. The image is partitioned into ranges and domains. Each domain and range is a subset of the image area. A transformation is generated for each domain. Each transformation is a $3 \times 3$ matrix identifying positional scaling coefficients and an intensity scaling coefficient, and a $3 \times 1$ vector identifying positional offset coefficients and an intensity offset coefficient. Any given transformation is not constrained to be contractive. Each domain is transformed into a corresponding transformed image scaled in size and intensity, based upon each domain's transformation, to map onto one of the ranges. Each domain's transformation is optimized in terms of the intensity scaling and offset coefficients. An optimized transformation is indicative of a domain's corresponding optimized transformation image. Each optimized transformation image is compared with the one range to provide error data as a function of the difference therebetween. A domain and corresponding optimized transformation is selected that minimizes the error data. These steps are repeated for a chosen plurality of the ranges that form a non-overlapping tiling of the image, where the corresponding optimized transformations associated with the chosen plurality form an eventually contractive map. Information that identifies each of the chosen plurality of the ranges and the selected domains and corresponding optimized transformations is then compactly stored in an addressable memory as an encoding of the image.

DESCRIPTION OF THE PREFERRED EMBODIMENT

Figure 1:
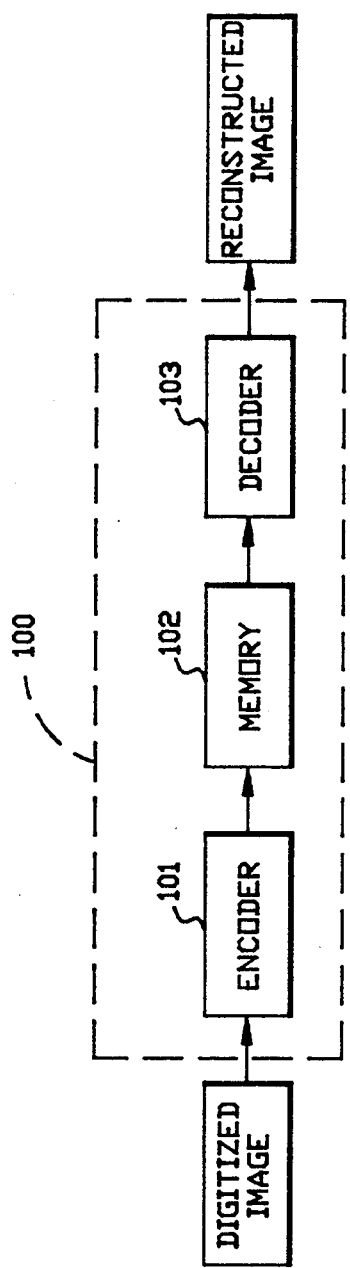
FIG. 1 is a schematic of the basic elements of a digital image compression system.

A digital image is defined by an array of individual pixels. Each pixel has its own level of brightness which, for monochrome images, has many possible gray levels, not just black or white. Thus, this type of image can be thought of as a three-dimensional object where each pixel has (x,y) positional coordinates and an intensity value coordinate z. As is known in the field of image compression, collections of these pixels can contain redundant information. Thus, image compression techniques remove such redundant information from an image (i.e., encode an image) in such a way that, after storage or transmission, the redundant information can be put back into the image (i.e., decode an image) resulting in a facsimile, or an approximation of the original collection of pixels.

The goal of fractal image encoding is to store an image as the fixed point of a map $W:F \to F$ from a complete metric space of images F, to itself. The space F can be taken to be any reasonable image model (collections of pixels), such as the space of bounded measurable functions on the unit square, etc. In this model, $f(x,y)$ or z represents the gray level of a pixel at the point $(x,y)$ in the image. The mapping W, or some iterate of W, is a contraction to insure rapid convergence to a fixed point upon iteration from any initial image. The goal is to construct the mapping W with a fixed point "close" (based on a suitable metric) to a given image that is to be encoded, and such that the map W can be stored compactly. Let $I = [0,1]$ and $I^m$ be the m-fold Cartesian product of I with itself. Let F be the space consisting of all graphs of real Lebesgue measurable functions $z = f(x,y)$ with $(x,y,f(x,y)) \in I^3$. A simple metric that can be used to measure fidelity is the sup metric $\delta_{sup}$ $$\delta_{sup}(f,g) = \sup_{(x,y) \in I^2} |f(x,y) - g(x,y)| \quad (1)$$

Other metrics, such as the rms metric $\delta_{rms}$ $$\delta_{rms}(f,g) = \left[ \int_{I^2} (f(x,y) - g(x,y))^2 \right]^{\frac{1}{2}} \quad (2)$$

have more complicated contractivity requirements. The rms metric is particularly useful since it can be easily minimized by performing standard regression of the algorithmic parameters. In the remainder of this description, the metric will be specified when relevant.

Since a typical digital image may be divided into a plurality of collections of pixels containing redundant information, the map W is constructed from local transformations $w_i$. Each local transformation $w_i$ is a transformation that maps one image area containing pixels (or domain) from the image onto another image area containing pixels (or range) from the image. Arriving at the best set of $w_i$ is the goal of the present invention. Here, the "best" set is one which achieves a desired level of compression at the highest achievable level of fidelity, or a desired level of fidelity at the highest achievable level of compression.

As a first step in the encoding method of the present invention, the digital image is defined as a plurality of data points having (x,y,z) coordinates that are stored in a computer memory. The image is then partitioned into a set of ranges (i.e., a range being a section of the image area containing a collection of pixels). The image is also partitioned into a set of domains (i.e., a domain being a section of the image area containing a collection of pixels). According to the principles of the iterated transformation process, the domains are mapped onto the ranges according to the parameters of the local transformations. Thus, for a range $R_i$, a domain $D_i$ and corresponding local transformation $w_i$ are sought that will minimize the error between the image over $R_i$ and the transformation of the image over $D_i$. By adhering to the principles of the iterated transformation process, a set of transformations (and corresponding domains) are obtained that, when iterated from any initial starting point, will converge to a fixed point that approximates the desired image. The set of ranges, domains and transformations therefore encode the image. Thus, to store or transmit the image, only information defining the ranges, domains and transformations need be stored or transmitted. From the ranges, domains and transformations, an approximation to the original image can be constructed (decoded). If the ranges, domains and transformations can be defined more compactly than the original image, then image compression is attained.

Figure 2:
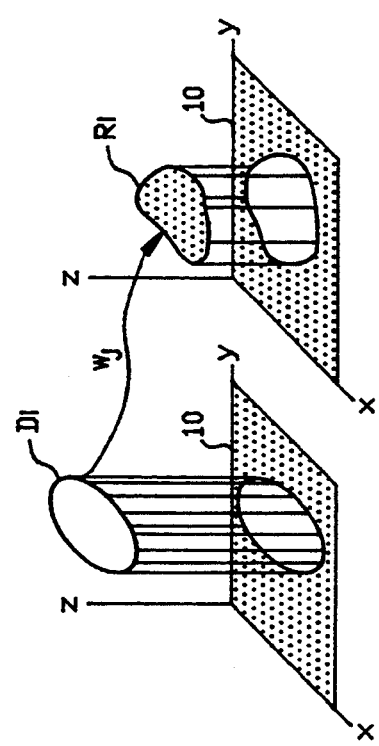
FIG. 2 is a graphical representation of the mapping process according to the present invention.

A graphical representation of the above described mapping process is shown in FIG. 2 where the x,y,z coordinate system is used to define a domain $D_i$ which is a subset of the area that comprises the entire image area 10. As is evident from FIG. 2, $D_i$ is a portion of the image area 10 which contains pixels at various levels of gray as indicated by the z component thereof. A transformation $w_i$ is chosen such that the domain $D_i$ can map onto a range $R_i$ which is another subset of the image area 10.

Thus, the overall transformation map W is defined as $$W = \bigcup_{i=1}^{n} w_i \quad (3)$$

The transformations $w_1, \ldots, w_n$ (i.e., the map W) must tile the image. This means that each $D_i$ defines a part of the image to which $w_i$ is restricted. When $w_i$ is applied to this part, the result maps onto a range $R_i$. The $R_i$'s must be non-overlapping and the union of the $R_i$'s must cover the image. Given W, it is easy to find the image that it encodes. Simply begin with any image $f_0$ and successively compute $W(f_0), W(W(f_0)), \ldots$ until the images converge to $|W|$. However, the converse is considerably more difficult for a given image f, i.e., how can a mapping W be found such that $|W|=f$? Essentially, an image $f' \in F$ is sought such that $\delta(f,f')$ is minimal with $f'=|W|$. Given equation (3), it is reasonable to seek domains $D_1, \ldots, D_n$ and corresponding transformation $w_1, \ldots, w_n$ such that $$f \approx W(f) = \bigcup_{i=1}^{n} w_i(f) \tag{4}$$

Equation (4) says that the transformations $w_i$, when applied to f, should result in f. The local transformations $w_1(f), \ldots, w_n(f)$ are said to cover the image f. Equality of equation (4) would imply that $f = |W|$. Being able to exactly cover f with parts of itself is not likely, so the best possible cover is sought with the hope that $|W|$ and f will not look too different, i.e., that $\delta(|W|,f)$, the error using an appropriate error metric, is small.

Thus, the encoding process can be summarized as follows: Partition the image into a set of ranges. For each range $R_i$, a transformation $w_i$ restricted to a domain $D_i$ is sought such that the error (measured by an appropriate metric) between the result of applying $w_i$ to the image over $D_i$, and the part of the image over $R_i$, is minimized. The map W is specified by the transformations $w_i$ and their corresponding domains $D_i$. The $w_i$'s must tile the image, and must be chosen such that some iterate of W is contractive.

A form for the transformations $w_i$, which is convenient for encoding a gray scale image is, $$w_i \begin{bmatrix} x \\ y \\ z \end{bmatrix} = \begin{bmatrix} a_i & b_i & 0 \\ c_i & d_i & 0 \\ 0 & 0 & s_i \end{bmatrix} \begin{bmatrix} x \\ y \\ z \end{bmatrix} + \begin{bmatrix} e_i \\ f_i \\ o_i \end{bmatrix} \tag{5}$$

where, for each pixel in $D_i$, $a_i$, $b_i$, $c_i$ and $d_i$ are positional scaling coefficients for transforming the position of the pixel;

$s_i$ is the intensity scaling coefficient for transforming the gray level of the pixel;

$e_i$ and $f_i$ are positional offset coefficients for the pixel; and $o_i$ is an intensity offset coefficient for the pixel. In the prior art, the map W is restricted to be contractive. This requires that all the local transformations $w_i$ be contractive based on the metric in equation (1). Therefore in equation (5), for all $w_i$, $$s_i < 1 \tag{6}$$

Here, contractivity refers to contractivity in the z direction. If the $w_i$'s were to act on the entire image, the $s_i$'s must be restricted such that $s_i < 1$. However, because each of the $w_i$'s is restricted to its corresponding domain $D_i$, contractivity in the z direction need not be a condition. This is a fundamental change to the mapping W. It means that when the local transformations $w_i$ are constructed, it is not necessary to impose any contractivity conditions on the individual transforms. A sufficient contractivity requirement is that W be eventually contractive. A map W is eventually contractive if there exists a positive integer m (called the exponent of eventual contractivity) such that the m-th iterate of W, or $W^{om}$, is contractive.

A brief explanation of how a transformation $W:F \to F$ can be eventually contractive but not contractive is in order. The map W is composed of a union of local transformations $w_i$, which operate on disjoint parts of an image. If the local transformations $w_i$ are chosen so that $$|w_i(x,y,z_1) - w_i(x,y,z_2)| < s_i |z_1 - z_2| \tag{7}$$

and $(x',y',z') = w_i(x,y,z)$ has $x'$ and $y'$ independent of z, then W will be contractive if and only if every $w_i$ is contractive, i.e., when $s_i < 1$ for all i. If any $s_i \geq 1$, then W will not be contractive. The iterated transform $W^{om}$ is composed of a union of compositions of the form $$w_{i_1}^{o} w_{i_2}^{o} \ldots w_{i_m} \tag{8}$$

Since the product of the contractivities bounds the contractivity of the compositions, the compositions may be contractive if each contains sufficiently contractive $w_{ij}$. The map W will be eventually contractive (in the sup metric) if it contains sufficient "mixing" so that the contractive local maps $w_i$ eventually dominate the expansive ones. In practice, by requiring significant contractivity in the x and y directions, (i.e. each domain is larger than any range onto which it is being mapped) the encoding process will nearly always result in an eventually contractive map W.

The choice of the set D, all possible domains from which the $D_i$'s are chosen, and the set R, all possible ranges from which the $R_i$'s are chosen, while an important design consideration of an encoder used to implement the method of the present invention, is not a novel aspect thereof. One such system of choosing is known as adaptive partitioning and is disclosed in Applicant's previously referenced copending patent application. Alternatively, choosing these subsets may be accomplished via quad-tree partitioning as taught by, for example, Jacquin. Either approach may be applied in the method of the present invention. Regardless of the method of choosing R and D, the above described encoding procedure can be carried out to achieve: 1) the best attainable fidelity (defined by the error metric) for a predetermined target compression, 2) the best attainable compression for a predetermined target fidelity, or 3) a balance between the two.

A more detailed description of the present invention will now follow by way of an example. First, the set D of all possible domains from which the $D_i$'s are chosen to encode the image must be defined. Similarly, the set R of all possible ranges from which the $R_i$'s are chosen to encode the image must be defined. Although, in general, R and D can be chosen to be any collection of subsets of the map, in this example they are taken to be collections of squares only.

For a 256×256 pixel, 8 bit per pixel image, the model is scaled such that the x,y,z coordinates are [0,255]×[0,255]×[0,255] (different size and resolution images can be scaled appropriately). The range set R is chosen to consist of 4×4, 8×8, 16×16, and 32×32 nonoverlapping subsquares of [0,255]×[0,255]. The domain set D is chosen to consist of 8×8, 16×16, 32×32 and 64×64 subsquares with sides which are parallel to or slanted at 45° angles from the natural edges of the image. To reduce the amount of information required to specify a particular domain square, domain squares are restricted to be centered on a lattice with vertical and horizontal spacing of ½ the side length of the domain square.

Figure 3:
FIG. 3 shows the eight possible orientations of a domain square to be mapped according to one possible implementation of the present invention.

Given a range square $R_i$ and a domain square $D_i$, there are eight possible orientations for $D_i$ to have when mapped onto $R_i$ by a map of the form of equation (5). These eight orientations are shown in FIG. 3. The size and position of $R_i$ and $D_i$, and a given orientation, define the coefficients $a_i$, $b_i$, $c_i$, $d_i$, $e_i$ and $f_i$ in equation (5). Insisting that transformation $w_i$ map $D_i$ to $R_i$ while minimizing the error therebetween, determines $s_i$ and $o_i$. In this way, the transformation $w_i$ is determined uniquely for a chosen metric.

Once the choice of sets R and D is made, the encoding problem is reduced to choosing a good set $\{R_i\}$ R, and the corresponding set $\{D_i\}$ D, such that good compression and an accurate encoding of the image results. To take advantage of local "flatness" in the image and to reduce the error in regions of high variability, the range squares are allowed to vary in size depending on the local conditions in the image.

The choice of $D_i$'s affects the accuracy of the image and the method used to find the $D_i$'s determines how much computation time the encoding takes. A search through all of sets D would clearly result in the choice that would best minimize the error. However, for applications where encoding time is a consideration, such a search may require too much computation time. To overcome this problem, a classification scheme is used to classify all possible domains in advance. The encoding process begins by initially choosing range squares $R_i$ to be 64 32×32 subsquares of the 256×256 pixel image. The first 32×32 range square is classified using the same scheme, and a search for the best domain square (with side length twice the range square) in the same class (or similar class) is performed. The best domain square is the one that, when mapped onto the current range square by means of an optimized $w_i$, results in the minimum error as measured by the metric being used. Optimizing $w_i$ can be carried out using techniques well known in the art. If the best domain square $D_i$ and its corresponding $w_i$ result in an error less than a predetermined tolerance, they are stored in a memory and the process is repeated for the next range square. If the predetermined tolerance is not satisfied, the range square is subdivided into four equal squares that overlap the initial range square (i.e., quad-tree partitioning) and the process is repeated until the tolerance condition is satisfied, or a range square of the minimum size (usually 4×4) is reached. The procedure is continued until the entire image is encoded.

For each range square tested, a domain square with side lengths greater than the side lengths of the range square is sought, such that the error condition is minimized. However, the method of the present invention is not limited to being contractive in the x and y directions. Accordingly, domain squares may be smaller than range squares.

The information that needs to be stored to define the map W which encodes the image for this example is as follows:
Size of the range square $R_i$ (the position of $R_i$ can be implicitly determined by the order of storage),
Size, position and orientation (i.e., 0° or 45°) of the domain square $D_i$,
Symmetry operation (described in FIG. 3) used in transforming $D_i$ onto $R_i$,
Intensity scale coefficient $s_i$, and
Intensity offset coefficient $o_i$.

The restriction on W to be eventually contractive places no apriori limitation on the coefficients s and o.

However, in practice, coefficients s and o must be discretized and stored using some reasonable number of bits. One such reasonable restriction is $0.2 < |s| \leq 2.0$ or $s=0$ where s is discretized such that it can be stored with 5 bits. A reasonable choice for o is to discretize it such that it is stored with 7 bits. The value of $s_i$ restricts the required possible values of $o_i$, allowing for more accurate storage of the $o_i$'s. Only the discretized values of s and o are considered when optimizing the transformations $w_i$ during the encoding process. Note that the fact that s can be negative simply means that the "negative" image of each domain is also, in effect, a part of the domain pool. Compactly storing this information that defines the map can be achieved using methods well known in the art.

Figure 4:
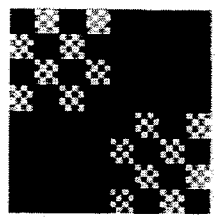
FIG. 4 is a digital image to be encoded by the method of the present invention.

Two specific examples implementing the above described method will now be given to illustrate the advantage of eventually contractive mappings. The first is a tutorial example and the second is an example of a typical gray scale image. For the first example, let $z=0$ represent black and $z=1$ represent white with values between 0 and 1 representing intermediate shades of gray. Consider the image shown in FIG. 4 and the 16 transformations which encode it as listed in TABLE 1.

TABLE 1

| i | a | b | c | d | s | e | f | o |
|---|---|---|---|---|---|---|---|---|
| 1 | 0.5 | 0.0 | 0.0 | 0.5 | 2.0 | 0.75 | 0.0 | 0.0 |
| 2 | 0.0 | 0.0 | 0.0 | 0.5 | 2.0 | 0.75 | 0.25 | 0.0 |
| 3 | 0.5 | 0.0 | 0.0 | 0.5 | 2.0 | 0.50 | 0.0 | 0.0 |
| 4 | 0.5 | 0.0 | 0.0 | 0.5 | 2.0 | 0.50 | 0.25 | 0.0 |
| 5 | 0.5 | 0.0 | 0.0 | 0.5 | 2.0 | 0.0 | 0.50 | 0.0 |
| 6 | 0.5 | 0.0 | 0.0 | 0.5 | 2.0 | 0.0 | 0.75 | 0.0 |
| 7 | 0.5 | 0.0 | 0.0 | 0.5 | 2.0 | 0.25 | 0.50 | 0.0 |
| 8 | 0.5 | 0.0 | 0.0 | 0.5 | 2.0 | 0.25 | 0.75 | 0.0 |
| 9 | 0.0 | −0.5 | 0.5 | 0.0 | 0.25 | 0.25 | −0.25 | 0.0 |
| 10 | 0.0 | −0.5 | 0.5 | 0.0 | 0.25 | 0.25 | 0.0 | 0.25 |
| 11 | 0.0 | −0.5 | 0.5 | 0.0 | 0.25 | 0.50 | −0.25 | 0.25 |
| 12 | 0.0 | −0.5 | 0.5 | 0.0 | 0.25 | 0.50 | 0.0 | 0.0 |
| 13 | 0.0 | −0.5 | 0.5 | 0.0 | 0.25 | 0.75 | 0.25 | 0.0 |
| 14 | 0.0 | −0.5 | 0.5 | 0.0 | 0.25 | 0.75 | 0.50 | 0.25 |
| 15 | 0.0 | −0.5 | 0.5 | 0.0 | 0.25 | 1.0 | 0.25 | 0.25 |
| 16 | 0.0 | −0.5 | 0.5 | 0.0 | 0.25 | 1.0 | 0.50 | 0.0 |

The first 8 transformations are restricted to act on the region $\{(x,y) | 0 \leq x \leq \frac{1}{2}, 0 \leq y \leq \frac{1}{2}\}$ and the second 8 transformations are restricted to act on the region $\{(x,y) | \frac{1}{2} \leq x \leq 1, 0 \leq y \leq \frac{1}{2}\}$ The map W is defined as the union of these 16 $w_i$'s and encodes the image shown.

Figure 5A:
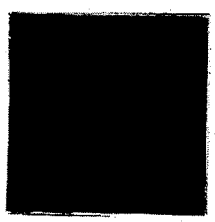
FIG. 5(a) is the starting point of a decoding iteration process.
Figure 5B:
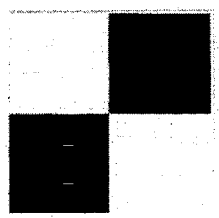
FIGS. 5(b)–5(g) are the first six iterates, respectively, of the decoding iteration process.
Figure 5C:
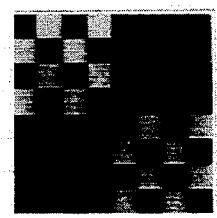
Figure 5D:
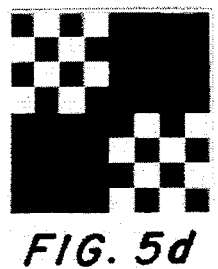
Figure 5E:
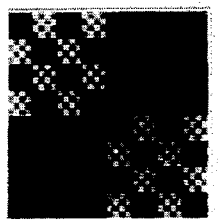
Figure 5F:
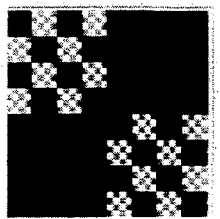
Figure 5G:
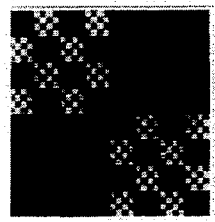
Figure 5H:
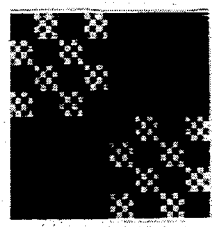
FIG. 5(h) is the fixed point of the decoding iteration process.

This can easily be demonstrated. The starting point of the (decoding) iteration is arbitrarily chosen as $z=0.5$ for $\{(x,y) | 0 \leq x \leq 1, 0 \leq y \leq 1\}$ as shown in FIG. 5(a). The first six iterates are shown in FIGS. 5(b)–5(g), respectively, and the fixed point is shown in FIG. 5(h). In practice, the values of x, y and z are discretized. Note that s in several of the transformations is greater than 1, which means that the corresponding $w_i$'s are not contractive. When the image in this example is discretized as 128×128 pixels, 8 bits per pixel, the encoding process described above automatically encodes this image (using an equivalent set of 16 transformations) with the resulting compression equal to 356:1. In contrast, if the encoding process is constrained such that each $s_i < 1$, 520 transformations are required to encode this image with a resulting compression ratio of only 10:1.

Figure 6A:
FIG. 6(a) is an original image to be encoded according to the method of the present invention.

The second specific example will now be described with the aid of FIGS. 6(a) and 6(b). For the original image shown in FIG. 6(a), let f be thought of as an integer valued function on the integer lattice in $[0,255] \times [0,255]$ with values in $[0,255]$. It is a $256 \times 256$ pixel image with 256 monochrome levels. Let $R = \{R_1, \ldots, R_{1024}\}$ contain 1024 non-intersecting $8 \times 8$ subsquares of $[0,255] \times [0,255]$. Let D be the collection of all $16 \times 16$ subsquares of $[0,255] \times [0,255]$. Using this choice for R and D, the image is encoded using the procedure described above. In this example, $D_i$ and $w_i$ were chosen by searching through all possible choices. Every $D_i$ was tested in all 8 possible orientations (corresponding to the elements of the symmetry group of the square). The rms metric was used in minimizing the error, and $s_i$ and $o_i$ were computed by least squares regression.

The largest allowable $s_i$ in equation (5) is denoted $$s_{max} = \max_i \{s_i\} \quad (9)$$

Figure 6B:
FIG. 6(b) is a decoded image of that shown in FIG. 6(a) that was reconstructed using the transformations developed by the encoding method of the present invention.

The result of applying the above described encoding process with $s_{max} = 1.5$ yields the $|W|$ shown in FIG. 6(b). Table 2 summarizes some results (all at a compression of 16:1) for this example.

TABLE 2

| $s_{max}$ | $\delta_{rms}(W(f),f)$ | $\delta_{rms}(|W|,f)$ |
|---|---|---|
| 0.7 | 20.04 | 21.48 |
| 0.9 | 19.77 | 21.16 |
| 1.2 | 19.42 | 21.16 |
| 1.5 | 19.42 | 20.97 |

The rms metric is used in TABLE 2 as a measure of the visual fidelity of the covering W(f), and the fixed point $|W|$. (Note that the sup metric is not used to measure visual fidelity.) The encodings with $s_{max} < 1$ are contractive, and the encodings with $s_{max} > 1$ are eventually contractive as measured with the sup metric. Thus, TABLE 2 indicates that improved encodings can be attained with eventually contractive mappings. This again demonstrates the effectiveness of the present invention.

Figure 7:
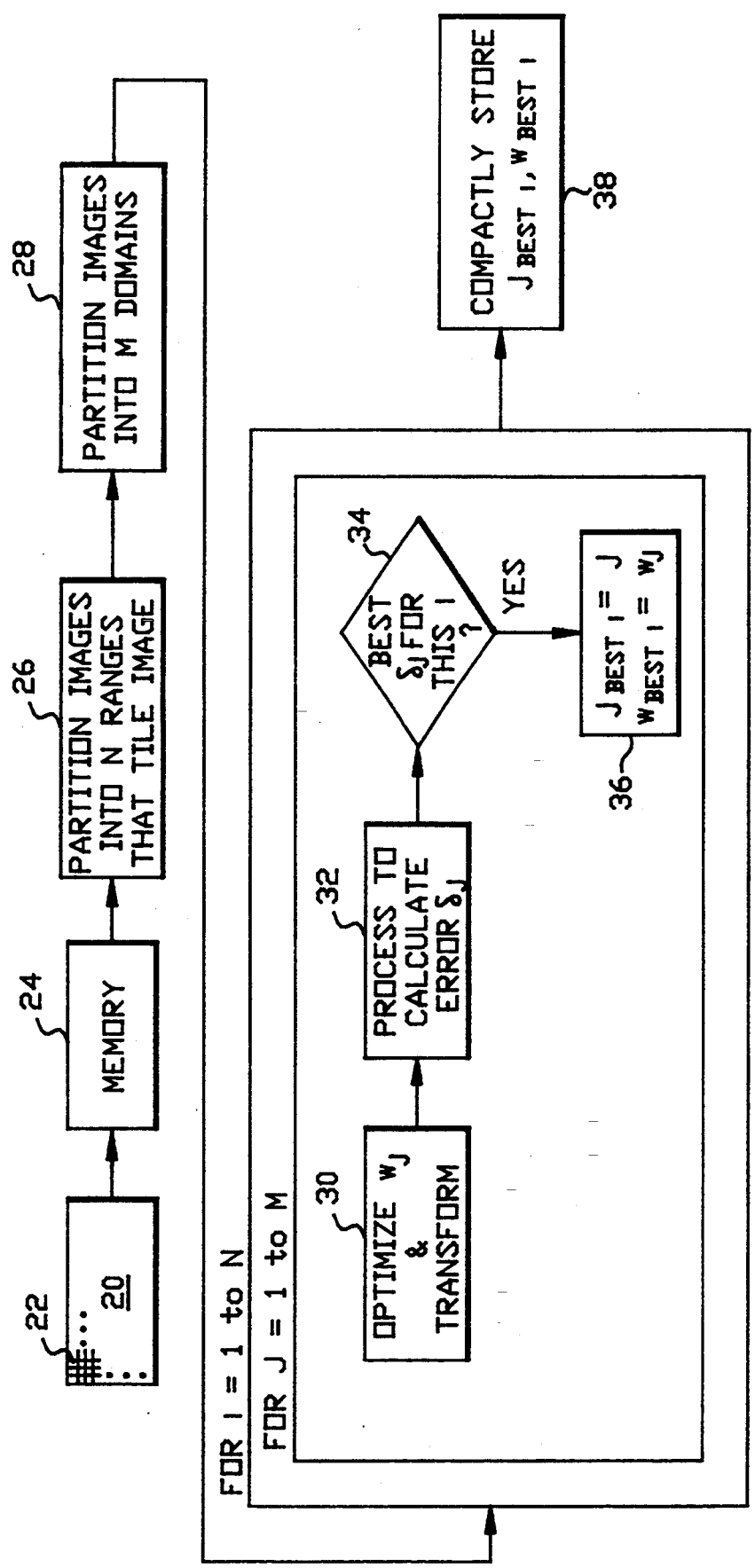
FIG. 7 is a schematic configuration of an apparatus for carrying out the method of the present invention.

Referring to FIG. 7, a schematic of an apparatus for carrying out the method of the present invention is shown. The schematic describes a very simple implementation of the present invention. It is to be understood that this is provided to explain the basic aspects of the present invention, and therefore does not include earlier described details of the process. Other implementations of the present invention that can result in superior encodings (such as the implementation described previously herein) are possible.

In FIG. 7, a digital image 20 to be encoded is defined by an array of individual pixel elements 22. As mentioned above, each pixel element is defined by (x,y,z) coordinates indicative of pixel position and intensity. The image is stored in a memory 24. A partitioner 26 generates a set of N ranges such that the ranges tile the image. A partitioner 28 generates a set of M domains. A domain $D_j$ is transformed using the optimized transformation $w_j$ at optimizer and transformer 30. The transformation $w_j$ is not constrained to be contractive. The error $\delta_j$ between the section of image over a range $R_i$, and the result of applying $w_j$ to the section of image over $D_j$, is calculated at a processor 32. As shown in FIG. 7, this process is repeated for each of the M domains. A comparator 34 selects the domain and corresponding transformation $w_j$ which best minimizes the error $\delta_j$. At a temporary memory 36, information identifying the selected domain and corresponding transformation are saved. This process is repeated for each of the N ranges. If the set of selected best transformations ($W_{BESTi}$) results in an eventually contractive map, the information defining the map ($j_{BESTi}$ and $w_{BESTi}$) is compactly stored (using methods well known in the art) in memory 38.

In practice, the ranges and domains defined by partitioners 26 and 28, respectively, can be chosen such that it is likely that the resulting map will be eventually contractive. However, before storing the map in memory 38, a simple check for eventual contractivity under the sup metric can be performed. If the resulting map is not eventually contractive, the maximum allowed value of $s_i$ (or $s_{max}$) can be reduced and the encoding process repeated.

The method of the present invention is not limited by a particular computer architecture. For instance, processing of each domain and transformation for a particular range could be carried out in a serial fashion. Alternatively, a plurality of domains and/or ranges may be processed simultaneously in a parallel fashion. More specifically, the processing of each domain $D_j$ for j=1 to M could be carried out in a parallel fashion. Similarly, the processing of each range $R_i$ for i=1 to N could be carried out in a parallel fashion. This would result in a two-tier parallel architecture.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method of data compression for compressed data storage or transmission over a data link of compressed data representing an image, said image being comprised of an array of pixels, each pixel having a position in said array, comprising the steps of:

acquiring a digital image that is a digital signal representation of said image, said digital image being represented by an array of pixel values defining an entire image area, each pixel value being defined by a three-dimensional vector identifying the position of the pixel in the array and an intensity level of the pixel;

partitioning the digital image into ranges, each range being a subset of the image area such that the set of ranges tile said image;

partitioning the digital image into domains, each domain being a subset of the image area;

generating for each range which is to be encoded a transformation for each member of said set of domains, said transformation comprising positional scaling coefficients and an intensity scaling coefficient, and further comprising positional offset coefficients and intensity offset coefficients, wherein at least one of the transformations is non-contractive;

using each said transformation to transform the corresponding member of said set of domains into a corresponding transformed digital image scaled in size and intensity to map onto each range which is to be encoded;

optimizing each said transformation in terms of the intensity scaling and offset coefficients, wherein an optimized transformation is indicative of a corresponding optimized transformed digital image for the associated range and may be non-contractive;

comparing each said optimized transformed digital image with the associated range to provide error data as a function of the difference therebetween;

selecting the domain and corresponding optimized transformation that minimizes the error data for the associated range such that some iterate of the entire set of said selected optimized transformations is contractive, thereby forming an eventually contractive map;

storing in an addressable memory information that represents said image by the digital representation of said set of encoded ranges, domains and corresponding optimized transformations.

2. A method according to claim 1 wherein said steps of generating, using, optimizing, comparing and selecting are performed in a serial fashion.

3. A method according to claim 1 wherein said steps of generating, using, optimizing, comparing and selecting are performed in a parallel fashion.

4. A method according to claim 1 wherein each domain which is to be used in said steps of generating, using, optimizing, comparing and selecting is larger in size than the associated range which is to be encoded.

5. A method according to claim 1 wherein the chosen plurality of the ranges is based on a predetermined number of ranges.

6. A method according to claim 1 wherein the chosen plurality of the ranges is based on a predetermined criteria of the error data.

7. The method of claim 1 wherein the transformation $w_i$ is of the form $$w_i \begin{bmatrix} x \\ y \\ z \end{bmatrix} = \begin{bmatrix} a_i & b_i & 0 \\ c_i & d_i & 0 \\ 0 & 0 & s_i \end{bmatrix} \begin{bmatrix} x \\ y \\ z \end{bmatrix} + \begin{bmatrix} e_i \\ f_i \\ o_i \end{bmatrix}$$

where, for a pixel in $D_i$, $a_i$, $b_i$, $c_i$ and $d_i$ are positional scaling coefficients for transforming the position of the pixel;

$s_i$ is the intensity scaling coefficient for transforming a gray level of the pixel;

$e_i$ and $f_i$ are positional offset coefficients for the pixel; and $o_i$ is an intensity offset coefficient for the pixel.

8. A method of data compression for compressed data storage or transmission over a data link of compressed data representing an image, said image being comprised of an array of pixels, each pixel having a position in said array, comprising the steps of:

acquiring a digital image that is a digital signal representation of said image, said digital image being represented by an array of pixel values defining an entire image area, each pixel value being defined by a three-dimensional vector identifying the position of the pixel in the array and an intensity level of the pixel;

defining at least one partition in said digital image so as to create a plurality of ranges which are to be encoded, each range being a section of said entire image area, there being a union of said ranges, wherein said union of said ranges tile said entire image area, thereby deriving a digital representation of each said partition;

using said digital representation of each said partition to identify each partitioned image area as a member of a set of domains;

generating for each range which is to be encoded a transformation for each member of said set of domains, said transformation comprising positional scaling coefficients and an intensity scaling coefficient, and further comprising positional offset coefficients and intensity offset coefficients, wherein at least one of the transformations is non-contractive;

using each said transformation to transform the corresponding member of said set of domains into a corresponding transformed digital image scaled in size and intensity to map onto each range which is to be encoded;

optimizing each said transformation in terms of the intensity scaling and offset coefficients, wherein an optimized transformation is indicative of a corresponding optimized transformed digital image for the associated range, and may be non-contractive;

comparing each said optimized transformed digital image with the associated range to provide error data as a function of the difference therebetween;

redefining each range which is to be encoded as an encoded range when at least one of said error data for the range is within predefined limits and adding said encoded range to said set of domains;

defining for each range which is still to be encoded following said step of redefining at least one additional partition in said digital representation of said range which is still to be encoded so as to create a plurality of non-overlapping image areas thereby deriving a digital representation of each said additional partition;

adding each range which is still to be encoded following said redefining step to said set of domains;

creating a new set of ranges which are to be encoded comprising said plurality of non-overlapping image areas;

repeating said steps of generating, using each said transformation, optimizing, comparing, redefining, defining, adding and creating to select a set of encoded ranges, domains and corresponding optimized transformations, wherein said set of encoded ranges form a non-overlapping tiling of said entire image area so as to create a digital representation of the entire partition comprising each said partition and each said additional partition and such that some iterate of said set of optimized transformations is contractive thereby forming an eventually contractive map; and storing in an addressable memory information that represents said image by said digital representation of said set of encoded ranges, domains and corresponding optimized transformations.

9. A method as in claim 8 wherein the transformation $w_i$ is of the form $$w_i \begin{bmatrix} x \\ y \\ z \end{bmatrix} = \begin{bmatrix} a_i & b_i & 0 \\ c_i & d_i & 0 \\ 0 & 0 & s_i \end{bmatrix} \begin{bmatrix} x \\ y \\ z \end{bmatrix} + \begin{bmatrix} e_i \\ f_i \\ o_i \end{bmatrix}$$

where, for a pixel in $D_i$, $a_i$, $b_i$, $c_i$ and $d_i$ are positional scaling coefficients for transforming the position of the pixel;

$s_i$ is the intensity scaling coefficient for transforming a gray level of the pixel;

$e_i$ and $f_i$ are positional offset coefficients for the pixel; and $o_i$ is an intensity offset coefficient for the pixel.

10. A method according to claim 8 wherein each domain which is to be used in said steps of generating, using each said transformation, optimizing, comparing and selecting is larger in size than the associated range which is to be encoded.

11. A method according to claim 8 wherein the chosen plurality of the ranges is based on a predetermined number of ranges.

12. A method according to claim 8 wherein the chosen plurality of the ranges is based on a predetermined criteria of the error data.

* * * * *